G. L. SELF.
TWINE HOLDER.
APPLICATION FILED JUNE 7, 1912.
1,061,330.
Patented May 13, 1913.
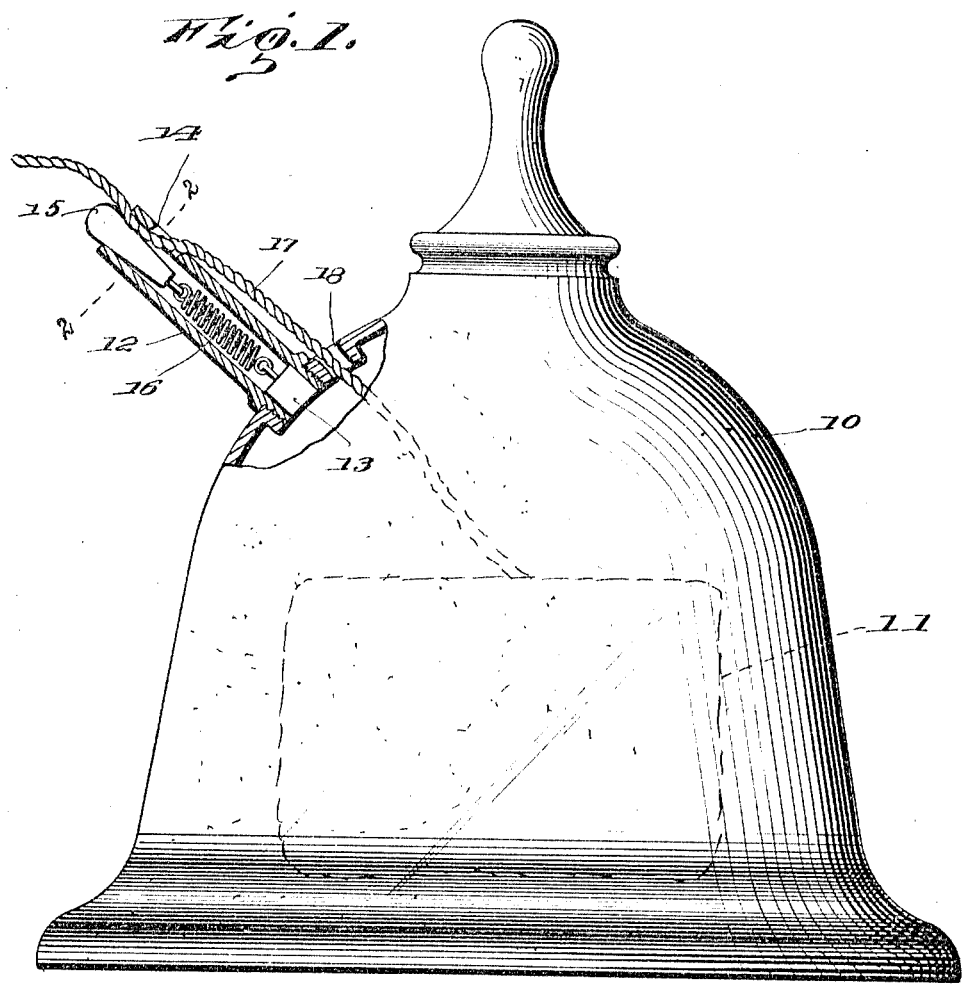
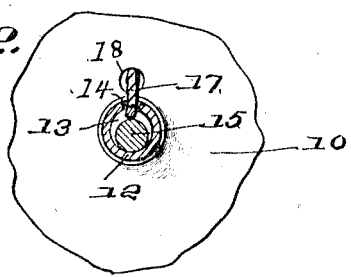

UNITED STATES PATENT OFFICE.

GEORGE L. SELF, OF ASHEVILLE, NORTH CAROLINA.

TWINE-HOLDER.

1,061,330.　　　　　　Specification of Letters Patent.　　Patented May 13, 1913.

Application filed June 7, 1912. Serial No. 702,316.

*To all whom it may concern:*

Be it known that I, GEORGE L. SELF, citizen of the United States, residing at Asheville, in the county of Buncombe and State of North Carolina, have invented certain new and useful Improvements in Twine-Holders, of which the following is a specification.

This invention relates to improvements in holders for wrapping twine, more particularly to tension devices whereby the movement of the cord is controlled, and has for one of its objects to provide a simply constructed device of this character of increased efficiency and utility.

Another object of the invention is to provide a simply constructed device which may be attached without material structural change to cord receptacles of various forms and sizes and which effectually holds the cord from too free movement when withdrawn from the holder and without injuring the cord.

Another object of the invention is to provide a simply constructed device which automatically adapts itself to inequalities in the cord and likewise to cords of various sizes.

With these and other objects in view, the invention consists in certain novel features of construction as hereafter shown and described, and then specifically pointed out in the claims, and in the drawings illustrative of the preferred embodiment of the invention: Figure 1 is an elevation of a conventional cord receptacle partly in section, with the improved tension device attached, the latter being likewise in section; Fig. 2 is a transverse section on the line 2—2 of Fig. 1.

Corresponding and like parts are referred to in the following description and indicated in all the views of the drawings by the same reference characters.

The cord holder comprises a casing or receptacle 10 for the ball of twine indicated at 11. The receiver or casing 10 may be of any form or size and arranged to hold the twine in any desired manner either in the form of an ordinary ball as represented, or in connection with a reel or cone of twine, and it is not desired to limit the invention in any manner to the form of the container or support for the twine. The twine receiver or support forms no part of the present invention, and it is not deemed necessary to further illustrate the same.

The improved device comprises a tubular member 12 connected in any suitable manner to the receiver 10 or other support for the twine and is closed at the inner end, preferably by a detachable plug 13, and open at the outer end and with a transverse aperture 14 in one side of the tube near the outer end. Slidably disposed within the tube 12 at its outer end is a conical holding member 15, the member being coupled yieldably to the plug 13 by a spring 16 within the tube. By this means the member 15 is held yieldably in position and drawn constantly inward toward the bottom end of the tube, and the spring entirely concealed within the tubular member and protected thereby. The outer portion of the cord, represented conventionally at 17, leads through the aperture 14 and thence between the member 15 and the tubular member 12. The member 15 is of sufficient size so that when the cord 17 is in place between the member 15 and the inner wall of the tubular member 12, the member 15 will be retained in position and prevented from movement entirely within the tube, and thus exerts a tension force upon the cord and holds the latter from too free movement. The cord leads from the ball 11 through an aperture 18 in the receiver 10 and thence through the aperture 14, thus exposing only a relatively short portion of the cord. The cord is thus retained in place and prevented from moving too freely while at the same time may be drawn outwardly against the resistance of the spring, and the moment that the strain is removed the member 15 immediately exerts sufficient force upon the cord to hold the same from further movement. Thus when the clerk desires to wrap the cord around a package, the required quantity of cord may be drawn outwardly and the moment that the outward strain is removed the member 15 is immediately and automatically moved into engagement with the cord by the spring 16 and thus stops any further outward movement of the cord and holding the same in convenient position for use for the next package. By this simple means all waste of the cord is prevented as just sufficient cord to supply the wants of the clerk is drawn outwardly at any required time.

It will be noted that the outward pull of the cord is in substantially the same plane as the longitudinal axis of the plug and of the tubular member, hence no lateral strain is produced upon the cord to fracture or impair the same.

The edges of the lateral aperture 14 are rounded to reduce the friction against the cord and prevent abrasion thereof. By this arrangement light and flexible cords may be employed without danger of fracturing the same, as the friction between the cord and the plug is very slight.

The improved device is simple in construction, can be inexpensively manufactured and applied, and of any required size and of any suitable material.

Having thus described the invention, what is claimed as new is:

1. In a device of the class described, a cord receptacle having a cord delivery aperture, a tubular member extending from said receptacle adjacent to the aperture and open at the outer end, said tubular member having a lateral aperture spaced from its open end, a tapered plug engaging in the outer open end of the tubular member, and a spring within the tubular member and concealed and protected thereby and connected to said plug and to the closed end of the tubular member and operating to maintain said plug yieldably in its inner position, said plug being adapted to bear against a cord when passed through the aperture of the receptacle and through the aperture of the tubular member and holding the cord constantly in the same plane as the longitudinal axis of the plug.

2. A cord holder comprising a tubular member open at the outer end and with a lateral aperture spaced from the open end, a tapered plug engaging in the open end of the tubular member, and a spring within the tubular member and protected and concealed thereby and connected respectively to the plug and to the tubular member, said plug adapted to engage a cord when passed through the aperture and out through the open end of the tubular member.

In testimony whereof I affix my signature in presence of two witnesses.

GEORGE L. SELF. [L. S.]

Witnesses:
R. N. BRANSON.
D. S. GRANT.